No. 665,477. Patented Jan. 8, 1901.
C. W. SLEEPER.
FLUX FEEDING DEVICE.
(Application filed Aug. 20, 1900.)

(No Model.)

Witnesses.
Edward L. Rand
Rogers Dow

Inventor.
Charles W. Sleeper
by his atty.
Charles W. Reed

UNITED STATES PATENT OFFICE.

CHARLES W. SLEEPER, OF LANCASTER, NEW HAMPSHIRE, ASSIGNOR TO THE SLEEPER MACHINE COMPANY, OF MAINE.

FLUX-FEEDING DEVICE.

SPECIFICATION forming part of Letters Patent No. 665,477, dated January 8, 1901.

Application filed August 20, 1900. Serial No. 27,383. (No model.)

*To all whom it may concern:*

Be it known that I, CHARLES W. SLEEPER, a subject of the Queen of Great Britain and Ireland, residing at Lancaster, in the county of Coos and State of New Hampshire, have invented a new and useful Improvement in Flux-Feeding Devices, of which the following is a specification.

My invention consists of a device for feeding the flux used in the process of soldering the caps of tin cans.

In packing food products into cans it is customary to leave an opening through the top of the can, and after the can is filled to close this opening by soldering a cap over it. When the can is to be filled with liquid, the cap may be quite small, but with fruits and other solid foods the cap is made of a convenient size to permit of proper packing, and in some instances the cap consists of the whole top, which is soldered in after the goods are put into the can. The process is similar for all sizes of caps, in that the cap and top are fitted together, leaving an annular groove to be filled with solder, and to insure uniform soldering it is necessary to apply a suitable flux to this groove. The device herein described is designed to apply dry or granular flux—such as powdered resin, resin and sal-ammoniac, or similar substances—for this purpose.

Figure 1:
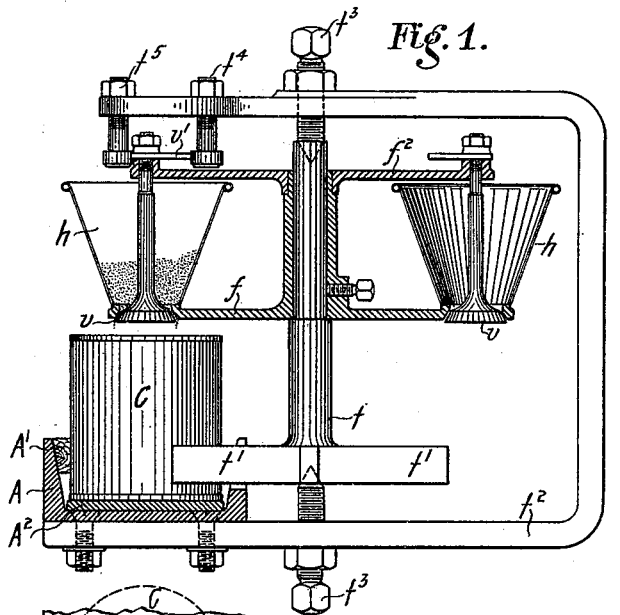
Figure 2:
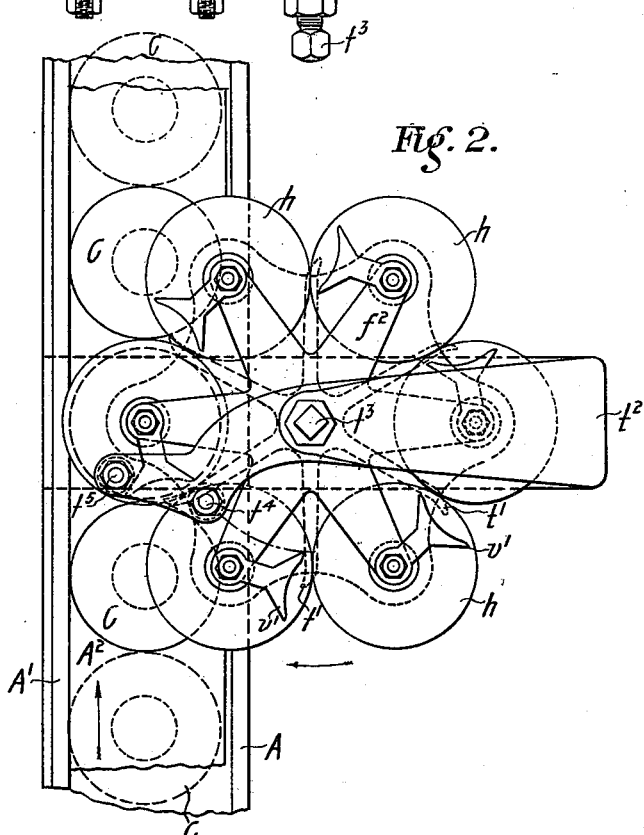

In the drawings accompanying this specification, Figure 1 is a side view of my device with trough and hoppers shown in section. Fig. 2 is a top view of the same.

A is a carrier-trough, usually a piece of channel-iron with the flanges turned upward.

A' is a strip of wood secured to the inside of the trough to limit the width of same where the fluxing device is applied and to aid in guiding the cans.

$A^2$ is an endless belt resting upon the bottom of the trough and moving in the direction of the arrow. By means of this belt the cans to be soldered are carried through the trough A and brought in turn to the point where the fluxing takes place.

$h\ h$ are hoppers which carry the flux. In the device shown in the drawings six hoppers are used; but the number may be increased or diminished, if found more convenient.

$f$ is a carrier, to the upper side of which the hoppers are secured.

In the bottom of each hopper is a circular opening, and a corresponding opening is made through the carrier, chamfered on the under side to form a seat for the valve $v$, which nearly closes the opening, leaving only a narrow annular space through which a small quantity of flux sifts when the valve is moved, as hereinafter described.

A spider $f^2$, having the same number of arms as there are hoppers, is secured to the hub of the carrier $f$ and the stems of the valves $v\ v$ pass up through holes in the extremities of these arms and are rigidly attached to the fish-tail levers $v'\ v'$, which rest loosely upon annular projections on the upper sides of said arms surrounding the stems of the valves $v\ v$. The valves $v\ v$ are thus loosely suspended in the hoppers and capable of horizontal vibratory motion therein. The carrier $f$ is secured to the spindle of a turnstile $t$, which is provided with as many arms $t'\ t'$ as there are hoppers $h\ h$.

$t^2$ is a frame adjustably secured to the trough A.

$t^3\ t^3$ are pivot-screws passing through the top and bottom of the frame $t^2$ and entering the centers of the turnstile $t$.

As the cans to be soldered are carried along the trough A by the endless belt $A^2$ they strike against the arms of the turnstile $t$, thereby causing it to revolve and to carry with it the carrier $f$ and the hoppers mounted thereon.

$t^4\ t^5$ are studs projecting downward from the top of the frame $t^2$ and so arranged that as the turnstile revolves upon the pivots $t^3\ t^3$, bringing each hopper in turn over one of the cans to be soldered, the fish-tail levers $v'\ v'$ will strike the stud $t^4$ upon one side and then the stud $t^5$ upon the other side, the sudden jar thus given to the valve by these two blows causing it to oscillate horizontally with a quick vibratory motion and sift a little of the flux out of the hoppers upon the can beneath.

The valves $v\ v$ should be a little smaller than the can-cap used, and the device should be so adjusted in relation to the conveyer-trough A that the valves shall be directly over the can-caps when the valves are moved, so that the flux will drop directly into the grooves to be soldered.

What I claim, and desire to secure by Letters Patent, is—

1. The flux-hopper $h$ having a circular opening in the bottom of the same, in combination with the valve $v$ loosely suspended in said hopper and partially closing said opening, means for bringing the hopper over the head of the can to be soldered and means for giving vibratory motion to said valve, substantially as described.

2. The flux-hopper $h$ having a circular opening in the bottom of the same, in combination with the valve $v$ loosely suspended in said hopper and partially closing said opening, the fish-tail lever $v'$ rigidly attached to the stem of said valve $v$ and means for giving said lever vibratory motion substantially as described.

3. The horizontally-revoluble carrier $f$ with flux-hoppers $h$ mounted thereon, each of said hoppers having a valve $v$ loosely suspended therein and fish-tail lever $v'$ rigidly attached to the stem of said valve, in combination with studs $f^4 f^5$ adapted to engage said levers and means for revolving said carrier and bringing said levers into contact with said studs substantially as described.

4. In a machine for fluxing the heads of cans, the endless belt $A^2$ and trough $A$ in combination with a horizontally-revoluble carrier $f$, with flux-hoppers $h$ mounted thereon, turnstile $t$ and means for discharging flux from the hoppers as they pass over the can-heads, substantially as described.

5. In a machine for fluxing the heads of cans, the endless belt $A^2$ and trough $A$, in combination with a horizontally-revoluble carrier $f$ with flux-hoppers $h$ mounted thereon, each of said hoppers having a valve $v$ and fish-tail lever $v'$, studs $d^4 d^5$ adapted to engage said levers, and turnstile $t$, substantially as described.

In testimony whereof I have signed my name to this specification in the presence of two subscribing witnesses.

CHARLES W. SLEEPER.

Witnesses:
F. D. HUTCHINS,
W. H. McCORTEN.